United States Patent

Ikeda et al.

[11] Patent Number: 5,151,482
[45] Date of Patent: Sep. 29, 1992

[54] PROCESS FOR THE PRODUCTION OF METHACRYLIC RESIN SHEETS

[75] Inventors: Hiroyuki Ikeda; Michitoshi Shinka, both of Toyama; Suehiro Tayama, Otake; Tetuya Sawano, Otake; Masahiro Saruta, Otake, all of Japan

[73] Assignee: Mitsubishi Rayon Co., Ltd., Japan

[21] Appl. No.: 743,998

[22] Filed: Aug. 12, 1991

[30] Foreign Application Priority Data

Sep. 4, 1990 [JP] Japan ................. 2-233998

[51] Int. Cl.$^5$ .................. C08F 120/14; C08F 4/34; C08F 4/04
[52] U.S. Cl. ............... 526/329.7; 526/219.6; 526/227
[58] Field of Search ........... 526/329.7, 219.6, 227

[56] References Cited

U.S. PATENT DOCUMENTS 4,328,329  5/1982  Novak .................... 526/218
4,588,798  5/1986  Heitner .................. 526/228

FOREIGN PATENT DOCUMENTS 49-33993    5/1974  Japan.
56-145907   9/1981  Japan.
55725       7/1982  Japan.

OTHER PUBLICATIONS

Catalogue of "Organic Peroxides" published by Nippon Oil and Fats Co., Ltd. with its partial English translation.
"A new way to cast methyl methacrylate" by Plastics Engineering, May 1975, pp. 51–53.

*Primary Examiner*—Joseph L. Schofer
*Assistant Examiner*—Wu C. Cheng
*Attorney, Agent, or Firm*—Brumbaugh, Graves, Donohue & Raymond

[57] ABSTRACT

A monomer comprising methyl methacrylate either alone or in combination with another acrylic or methacrylic ester monomer is partially polymerized to prepare a syrup, to which an initiator including a peroxide having a 10-hour half-life temperature of 50° to 58° C. and 2,2'-azobisisobutyronitrile are added. The resulting syrup, after being poured into a mold, is initially polymerized in a first step at a temperature of 75° to 90° C. for a period of 5 to 15 minutes, then further polymerized in a second step at a temperature 3° to 12° C. lower than the temperature of the first step polymerization until a conversion of monomer to polymer of 80 to 95% is attained. The polymerization product which is now in the form of a sheet is then heat-treated at a temperature of 95° to 140° C. to obtain a methacrylic resin sheet. According to this process, methacrylic resin sheets having little residual monomer and being substantially free of defects can be manufactured with high productivity.

11 Claims, No Drawings

PROCESS FOR THE PRODUCTION OF METHACRYLIC RESIN SHEETS

BACKGROUND OF THE INVENTION

1. Field of the Invention

This invention relates to a process for producing methacrylic resin sheets and, more particularly, to a process for more efficiently producing methacrylic sheets with increased productivity achieved by using specific combinations of polymerization initiators and process conditions for polymerizing the methacrylic monomer either alone or in combination with another acrylic monomer.

2. Description of the Prior Art

In the production of polymethyl methacrylate sheets by cast polymerization, a large number of polymerization initiators have heretofore been proposed in attempts to improve productivity. For example, polymerization initiators having high activity at low temperatures, such as those having a 10-hour half-life temperature of 80° C. or below, preferably 60° C. or below, have been used because they can promote the polymerization.

However, the use of such polymerization initiators having a low half-life temperature increases the amount of unreacted monomer remaining after completion of the polymerization step and accordingly, degrades the quality of the resulting cast sheets. In order to decrease the amount of unreacted monomer, composite polymerization initiators have been proposed such as those comprising a combination of a low-temperature polymerization initiator and a hightemperature active polymerization initiator including those described in Japanese Patent Laid-Open Nos.33993/'74, 725/'80 and 145907/'81, and Japanese Patent Application Publication No. 16762/'90.

However, the processes disclosed in Japanese Patent Application Laid-Open Nos.33993/'74 and 725/'80 do not necessarily employ polymerization conditions which bring about a satisfactory improvement in productivity.

On the other hand, the process disclosed in Japanese Patent Application Laid-Open No 145907/'81 is considerably more effective in improving productivity, depending upon the specific combination of polymerization initiators actually used. However, from the viewpoint of utility, some difficulties are encountered in using polymerization initiators having a 10-hour half-life temperature of 50° C. or below. Additionally, in this publication there is no disclosure given or any detailed explanation provided of the actual polymerization conditions used.

SUMMARY OF THE INVENTION

It is an object of the present invention to provide a process for producing methacrylic resin sheets more efficiently with increased productivity.

It is another object of the present invention to provide a process for producing methacrylic resin sheets having reduced amounts of unreacted monomer(s) remaining in the cast-polymerized resin sheets which in turn prevents or minimizes the chances that the resin sheets will develop defects.

According to the present invention, there is provided a process for producing a methacrylic resin sheet comprising forming a syrup by partially polymerising methyl methacrylate alone or a monomer mixture of at least 60% by weight of methyl methacrylate and up to 40% by weight of an acrylic or methacrylic ester adding a polymerization initiator comprising at least one peroxide having a 10-hour half-life temperature of from 50 to 58° C. and 2,2'-azobisisobutyronitrile, introducing the partially polymerised syrup into a mold, polymerizing the syrup in the mold in a first step at a temperature of from 75° C. to 90° C. for a period of 5 to 15 minutes, further polymerizing the syrup in a second polymerization step at a temperature of from 3 to 12° C. below that of the first polymerization step until a conversion of monomer to polymer of 80 to 95% is attained and heat-treating the polymerization product at a temperature of 95° C. to 140° C. to substantially complete the polymerization thereby forming a methacrylic resin sheet.

DETAILED DESCRIPTION OF THE PREFERRED EMBODIMENTS

The syrup to be used in the process of the present invention is prepared in a syrup preparation step by partially polymerizing methyl methacrylate either alone or as a monomer mixture composed of 60% by weight or more of methyl methacrylate and 40% by weight or less of an acrylic or methacrylic ester in the presence of a conventional polymerization initiator. If necessary, a chain transfer agent additionally may be added to the polymerization mixture. The acrylic or methacrylic esters which can be used in admixture with methyl methacrylate include methyl acrylate, ethyl acrylate, n-butyl acrylate, 2-ethylhexyl acrylate or butyl methacrylate. The acrylic or methacrylic esters may be used alone or in combination of two or more esters.

In preparing the syrup, a mixture composed of the above-described monomer or monomers and a conventional polymerization initiator is subjected to partial polymerization at a temperature of 70 to 120° C., usually until a conversion of monomer to polymer of 10 to 40% is attained The reactor used in the syrup preparation step can be any conventional reactor of the tubular or tank type. This step may be carried out either in batch operation or in continuous operation.

In the next step, at least one peroxide having a 10-hour half-life temperature (measured in benzene at a concentration of 0.05 mol/1) of 50 to 58° C. and 2,2'-azobisisobutyronitrile are added to the syrup previously prepared as described above.

The peroxides having a 10-hour half-life temperature of 50 to 58° C., which can be used in the present invention, include peroxy esters such as tert-hexyl peroxypivalate, tert-butyl peroxypivalate and tert-butyl peroxyneohexanoate; and diaoyls such as 2,4-dichlorobenzoyl peroxide and o-methylbenzoyl peroxide, with the peroxy esters being preferred.

The polymerization initiators are added to the syrup in amounts, based on the amount of syrup, of 500 to 5,000 ppm, preferably 800 to 3,000 ppm, for the peroxide and 30 to 300 ppm, preferably 50 to 200 ppm, for 2,2'-azobisisobutyronitrile.

Then, the partially polymerized syrup is poured into a mold and subjected to cast polymerization. Specifically, this is done by initially polymerizing the syrup in a first polymerizing step at 75 to 95° C. for a period of 5 to 15 minutes, then polymerizing it in a second polymerizing step at a temperature of 3 to 12° C., preferably 5 to 10° C., lower than the temperature of the first polymerizing step until a conversion of monomer to polymer of 80 to 95% is attained and finally heat-treating the polymerization product which by now is formed into a sheet at a temperature of 95 to 140° C., preferably for a period of 0.05 to 2 hours, to complete the polymerization.

The final heat treatment step is preferably carried out while the resin sheet is still in the mold. However, it is also possible to heat-treat the resin sheet after removal from the mold.

If a peroxide polymerization initiator having a 10-hour half-life temperature lower than 50° C. is added to the syrup, the polymerization of the syrup will proceed gradually at room temperature (20 to 30° C.), resulting in an increase in viscosity. In order to prevent premature polymerization and the attendant increase in viscosity occurring, any equipment, such as piping and other fittings and fixtures, used in the storage and casting of the formulated preprepared syrup has to be cooled to 15° C. or below, preferably 10° C. or below, which requires the use of specialised equipment that is costly to build and maintain On the other hand, if a peroxide polymerization initiator having a 10-hour half-life temperature higher than 58° C. is used, the polymerization rate will be too low to be effective in improving productivity.

If the amount of peroxide polymerization initiator added is less than 500 ppm, there will be insufficient initiator present to attain the conditions necessary for an increase in productivity, while on the other hand, if the amount of initiator is greater than 5,000 ppm, the cast sheet will have a tendency to contain bubbles or voids.

The use of peroxides other than the peroxy esters, such as diacyls and dicarbonates, can result in the same increase in productivity as does the use of peroxy esters. However in some oases these other peroxides must be used with care since their use may significantly fade the color produced by certain of the colorants such as green dyes used in the manufacture of coloured sheets and thus adversely affect the appearance of the sheets to be produced.

Since 2,2'-azobisisobutyronitrile is a polymerization initiator which is active at high temperatures, it cannot be used alone as it produces very slow polymerization and as such cannot be expected to result in an improvement in productivity. However, when it is used in combination with the above-referenced peroxides, the combination is highly effective in decreasing the amount of residual monomer(s) remaining during the heat treatment at 95 to 140° C. The amount of 2,2'-azobisisobutyronitrile added in accordance with the present invention is in the range of 30 to 300 ppm based on the amount of syrup. However, if the amount added is less than 30 ppm, no effect will be produced, while if the amount added is greater than 300 ppm, the resulting cast sheets will have a tendency to contain bubbles or voids.

If other polymerization initiators such as azobis(dimethylvaleronitrile) are used ln large amounts, the polymeriztion rate can be increased. However, the resulting cast sheets will contain a large number of bubbles or voids and hence show a marked reduction in commercial value.

In addition to the use of the above-described composite polymerization initiator, polymerization temperatures employed in the process of the present invention constitute an important factor in improving productivity. In the present process, as described above, the syrup is initially polymerized at a first polymerization temperature of 75° to 90° C. for a period of 5 to 15 minutes, and then polymerized at a second polymerization temperature of from 3 to 12° C. lower than the first polymerization temperature until the amount of conversion of monomer to polymer of 80 to 95% is attained. Thereafter, the sheet is heat-treated at a temperature of 95° to 140° C., preferably for a period of 0.05 to 2 hours. Thus, the polymerization temperature in the initial stage is relatively elevated so as to increase the polymerization rate and thereby increase productivity, while the polymerization temperature in the succeeding stage is relatively lowered so as to control the heat of polymerization and thereby prevent the resin sheet from developing defects such as bubbles or voids.

If the difference between the first and second polymerization temperatures is less than 3° C., the temperature for the second polymerization step becomes relatively high since that for the first step is set at a high temperature, removal of the heat of polymerization reaction becomes difficult and thus bubbles or voids tens to occur in the resin sheet to be produced However, if the difference between the two temperatures is greater than 12° C., the polymerization temperature of the second stage will be excessively low, the time necessary for completing the polymerization will be prolonged to destroy the attempt for shortening the polymerization time through the improved first polymerization step, and thus any gains in productivity will be substantially lessened.

The molds which can ba used in the cast polymerization step include a mold composed of platea such as tempered glass plates, chrome-plated plates or stainless steel plates, and a gasket made of soft vinyl chloride resin; or a mold composed of the opposed surfaces of a pair of endless belts spaced apart from each other travelling at the same speed in the same direction, and gaskets travelling adjacent to both edges of the endless belts at the same speed as the endless belts.

The resin sheets produced by the polymerization process of the present invention usually have a thickness in the range of 1 to 10 mm. In the polymerization process of the present invention, the syrup may additionally contain colorants, plasticizers, lubricants, mold releasing agents, stabilizers, fillers or other additives and the like as desired.

The present invention will now be further illustrated by reference to the following examples.

In these examples, evaluations were made according to the following procedures.

1) The time required to reach a polymerization peak in a water bath was determined by inserting a thermocouple of 1.5 mm diameter into the syrup through the gasket and measuring the time at which the maximum temperature was reached in the syrup.

2) The presence or absence of bubbles in the cast sheet was examined with the naked eye and rated as follows:
○ : No bubbles.
△ : 1 to 2 bubbles per square meter.
X : 3 or more bubbles per square meter.

3) The amount of monomer remaining in the cast sheet was determined by gas chromatography.

4) In order to determine the viscosity $[\eta]$ of the cast sheet, a sample thereof was dissolved in chloroform to form a 0.1 wt% solution While this solution was maintained at 25° C., the time (t seconds) for its meniscus to fall between the marks of an Ostwald viscometer was measured. The falling time of chloroform ($t_0$ seconds) was also measured in the same manner. Then, the viscosity [η] of the cast sheet was calculated from the following equation.

$$[\eta] = \frac{3\{(t/t_0)^{\frac{1}{2}} - 1\}}{C}$$

where C is the concentration (in g/l) of the sample solution.

5) The viscosity stability of the formulated syrup was tested in the following manner.
○ : No substantial viscosity increase was noted when the formulated syrup was allowed to stand at room temperature (25° C.) for 8 hours
X : A viscosity increase of 20% or greater was noted when the formulated syrup was allowed to stand at room temperature (25° C.) for 8 hours.

EXAMPLE 1–4 AND COMPARATIVE EXAMPLES 1–9

(1) Preparations of syrups (A) Using 2,2'-azobis(2,4-dimethylvaleronitrile) as a polymerization initiator, methyl methacrylate monomer was partially polymerized by heating at 90–103° C. to form syrup (syrup A) having a 24% conversion of monomer to polymer and a viscosity of 1,800 cP at 20° C.

(B) Using 2,2'-azobis(2,4-dimethylvaleronitrile) as a polymerization initiator and n-dodecyl mercaptan as a chain transfer agent, methacrylate monomer was partially polymerized by heating at 90–103° C. to form a syrup (syrup B) having a 28% conversion of monomer to polymer and a viscosity of 2,000 cp at 20° C.

(2) Formation of cast sheets

To the syrup (A) or (B) prepared in (1) above were added the polymerization initiators as shown in Table 1, a mold releasing agent, an ultraviolet light absorber and a polymerization inhibitor Each of the formulated syrups was deaerated in a vacuum, poured into a casting cell composed of 35cm×65cm stainless steel plates, clips and a gasket made of soft vinyl chloride resin, and then polymerized to form a cast sheet having a thickness of 3 mm.

The polymerization was carried out in two stages. In the first stage, the formulated syrup was polymerized by immersing the cell in a water bath at 85–88° C. for a predetermined period of time. Thereafter, chilled water was poured into the water bath to lower its temperature to 80° C. and the second-stage polymerization was carried out. After a polymerization peak was reached, the cell was removed from the water bath and then heated by placing it in an infrared heated oven at a temperature of 300° C. As soon as the temperature within the cell reached 120° C., the cell was removed from the oven, allowed to stand for 5 minutes, and then cooled forcedly. The results of evaluation of the cast sheets thus obtained are shown in Table 1.

The polymerization initiators used in these examples and in the comparative examples are given below, together with their respective 10-hour half-life temperatures which are shown in parentheses.
HPP: tert-hexyl peroxypivalate (53° C.)
BpP: tert-butyl peroxypivalate (55° C.).
AIBN: 2,2'-azobisisobutyronitrile (65° C.)
BPND: tert-butyl peroxyneodecanoate (46° C.).
ADVN: 2,2'-azobis(2,4-dimethylvaleronitrile)(51° C.).
LPO: lauroyl peroxide (62° C.).

TABLE 1

| | Polymerization initiator (ppm) | | | | Formulated syrup | | First-stage polymerization | | Second-stage polymerization | | | Residual monomer | Viscosity [η] of cast sheet |
|---|---|---|---|---|---|---|---|---|---|---|---|---|---|
| | HPP | BPP | AIBN | Other | Starting syrup | Viscosity stability | Water-bath temp. (°C.) | Time (min) | Water-bath temp. (°C.) | Peak time* (min) | Bubbles | (%) | (l/g) |
| Ex. 1 | 3,000 | — | 200 | — | A | | 85 | 9 | 80 | 12.5 | | 0.68 | 0.17 |
| Ex. 2 | 1,500 | 1,500 | 200 | — | A | | 88 | 6 | 80 | 12 | | 0.80 | 0.17 |
| Ex. 3 | 3,000 | — | 200 | — | B | | 85 | 8 | 80 | 11 | | 0.82 | 0.11 |
| Ex. 4 | — | 3,000 | 200 | — | B | | 85 | 8 | 80 | 11 | | 0.76 | 0.11 |
| Comp. Ex. 1 | 3,000 | — | 200 | — | A | | — | — | 85 | 12 | Δ | 0.83 | 0.17 |
| Comp. Ex. 2 | 3,000 | — | 200 | — | A | | — | — | 80 | 14.5 | | 0.61 | 0.18 |
| Comp. Ex. 3 | — | — | 200 | BPND 2,600 | A | x | — | — | 85 | 11 | Δ | 1.69 | 0.16 |
| Comp. Ex. 4 | — | — | 200 | BPND 3,000 | A | x | — | — | 80 | 12.5 | | 1.27 | 0.17 |
| Comp. Ex. 5 | — | — | 200 | ADVN 1,500 | A | | — | — | 82 | 14.5 | x | 0.92 | 0.16 |
| Comp. Ex. 6 | 3,000 | — | — | — | B | | — | — | 80 | 13 | | 1.63 | 0.12 |
| Comp. Ex. 7 | 3,000 | — | 200 | — | B | | — | — | 85 | 10.5 | Δ | 1.01 | 0.11 |
| Comp. Ex. 8 | — | — | 200 | BPND 3,000 | B | x | — | — | 80 | 11 | | 1.43 | 0.11 |
| Comp. Ex. 9 | — | — | 200 | LPO 5,000 | B | | — | — | 80 | 23 | | 0.42 | 0.09 |

*Second-stage polymerization peak time includes the time at the first-stage polymerization.

It can be seen from Table 1 that, when compared with the comparative examples, the process of the present invention requires a shorter time to reach a polymerization peak and hence is indicative of an improved productivity. Moreover, the cast sheets produced in accordance with the process of the present invention exhibit no formation of bubbles and the contents of residual monomer is less than 1%.

However, in Comparative Examples 1, 3 and 7 in which a water-bath temperature of 85° C. was employed to improve productivity, the resulting cast sheets tended to exhibit the presence of bubbles in all cases. In Comparative Example 5 wherein an azobis-type polymerization initiator was used, it was noted that a large number of bubbles were formed in the cast sheet at a water-bath temperature of 82° C.

Where BPND was used as the polymerization initiator, as in Comparative Examples 3, 4 and 8, the time required to reach a polymerization peak was short, but the amount of the residual monomer remaining exceeded 1%. Moreover, the formulated syrup had poor viscosity stability and showed a viscosity increase of 30-50% upon standing at room temperature (25° C.) for 8 hours Where LPO was used (Comparative Example 9), the polymerization rate was low and no improvement in productivity was noted. Where HPP alone was used (Comparative Example 6), the amount of the residual monomer exceeded 1.5% and was in an amount which was much greater than the amounts observed in the examples illustrating the present invention (Examples 1-4).

We claim:

1. A process for producing a methacrylic resin sheet comprising forming a syrup by partially polymerising methyl methacrylate alone or a monomer mixture of at least 60% by weight of methyl methacrylate and up to 40% by weight of an acrylic or methacrylic ester adding a polymerization initiator comprising at least one peroxy ester having a 10-hour half-life temperature of from 50 to 58° C. and 2,2'-azobisisobutyronitrile to the syrup, introducing the syrup into a mold, polymerizing the syrup in the mold in a first step at a temperature of from 75° C. to 90° C. for a period of 5 to 15 minutes, further polymerizing the syrup in a second polymerization step at a temperature of from 3 to 12° C. below that of the first polymerization step until a conversion of monomer to polymer of 80 to 95% is attained and heat-treating the polymerization product at a temperature of 95° to 140° C. to substantially complete the polymerization thereby forming a methacrylic resin sheet.

2. A process as claimed in claim 1 wherein the peroxy ester is tert-hexyl peroxypivalate, tert-butyl peroxy pivalate or tert-butyl peroxyneohexanate.

3. A process as claimed in claim 1 wherein the peroxide is added in an amount of 500 to 5,000 ppm based on the amount of syrup.

4. A process as claimed in claim 3 wherein the peroxide is added in an amount of 800-3000 ppm.

5. A process as claimed in claim 1 wherein 2,2azobisisobutyronitrile is added in an amount of 30 to 300 ppm based on the amount of syrup.

6. A process as claimed in claim 5 wherein 2,2'-azobisisobutyronitrile is added in an amount of 50 to 200 ppm.

7. A process as claimed in claim 1 wherein the syrup is polymerized in a second polymerization step at a temperature of from 5° to 10° C. below the temperature of the first polymerizing step.

8. A process as claimed in claim 1 wherein the heat treatment is carried out for a period of 0.05 to 2 hours.

9. A process as claimed in claim 1 wherein the syrup is initially partially polymerized at a temperature from 70 to 120° C.

10. A process as claimed in claim 1 wherein the amount of conversion from monomer to polymer of the initial partial polymerization in the preparation of the syrup is from 10 to 40%.

11. A process as claimed in claim 1 wherein the mold is composed of opposed surfaces of a pair of spaced apart endless belts travelling at the same speed in the same direction, and continuous gaskets travelling adjacently to both edges of the endless belts at the same speed of the endless belts.

* * * * *